United States Patent [19]
Nishiki et al.

[11] Patent Number: 5,946,060
[45] Date of Patent: Aug. 31, 1999

[54] LIQUID CRYSTAL DISPLAY DEVICE AND METHOD FOR DRIVING THE SAME

[75] Inventors: Hirohiko Nishiki, Tenri; Yoshinori Shimada, Yamatokoriyama, both of Japan

[73] Assignee: Sharp Kabushiki Kaisha, Osaka, Japan

[21] Appl. No.: 08/867,804

[22] Filed: Jun. 3, 1997

[30] Foreign Application Priority Data

Jun. 3, 1996 [JP] Japan ................... 8-140529

[51] Int. Cl.⁶ .................... G02F 1/136; G02F 1/1343; G09G 3/36
[52] U.S. Cl. .................... 349/48; 349/33; 349/141; 349/143
[58] Field of Search .................... 349/139, 141, 349/142, 143, 144, 138, 42, 43, 48, 33, 34, 37; 345/87, 90, 92, 94, 95, 96

[56] References Cited

U.S. PATENT DOCUMENTS

| | | | |
|---|---|---|---|
| 3,981,559 | 9/1976 | Channin | 349/141 |
| 4,109,242 | 8/1978 | Channin | 349/33 |
| 5,576,858 | 11/1996 | Ukai et al. | 349/139 |
| 5,585,951 | 12/1996 | Noda et al. | . |
| 5,598,285 | 1/1997 | Kondo et al. | 349/39 |
| 5,608,556 | 3/1997 | Koma | 349/143 |
| 5,641,974 | 6/1997 | den Boer et al. | . |
| 5,777,700 | 7/1998 | Kaneko et al. | 349/129 |
| 5,781,261 | 7/1998 | Ohta et al. | 349/110 |
| 5,808,705 | 9/1998 | Hishida et al. | 349/129 |

FOREIGN PATENT DOCUMENTS 7-36058  2/1995  Japan .

Primary Examiner—William L. Sikes
Assistant Examiner—Tai V. Duong
Attorney, Agent, or Firm—Nixon & Vanderhye P.C.

[57] ABSTRACT

A liquid crystal display device includes: a first plate and a second plate; a liquid crystal layer provided between the first plate and the second plate, an interlayer insulation film provided between the first plate and the liquid crystal layer; a first electrode provided on a first face of the interlayer insulation film; a second electrode and a third electrode provided on a second face of the interlayer insulation film; and a counter electrode provided between the second plate and the liquid crystal layer. The first electrode and the counter electrode face each other in a first direction. The second electrode and the third electrode are provided in a picture element area at equal intervals in an alternate manner in a second direction perpendicular to the first direction.

11 Claims, 9 Drawing Sheets

LIQUID CRYSTAL DISPLAY DEVICE AND METHOD FOR DRIVING THE SAME

BACKGROUND OF THE INVENTION

1. Field of the Invention

The present invention relates to a liquid crystal display device (hereinafter, referred to as an LCD device) used as a display device for a television, a word processor, a notebook computer or the like; and a method for driving the same.

2. Description of the Related Art

One known LCD device is an active-matrix type LCD device including thin-film transistors (hereinafter, referred to as TFTs) functioning as switching elements provided in a matrix on an insulation plate made of glass or the like. The active-matrix type LCD device is expected to realize a flat panel display with high quality.

FIG. 8 is a cross-sectional view showing an exemplary configuration of a conventional LCD device. FIG. 9A is a plan view showing an exemplary configuration of one picture element area of an active-matrix substrate in the conventional LCD device shown in FIG. 8. FIG. 9B is a cross-sectional view of the active-matrix substrate taken along line C–C' in FIG. 9A.

As shown in FIG. 8, the conventional LCD device 800 includes the active-matrix substrate 800a including TFTs 3, drain electrodes 4 (display electrodes, only one drain electrode 4 is shown in FIG. 8), gate lines (scanning lines, FIG. 9A), and data lines (signal lines, FIG. 9A) provided on an insulation plate 6a; and a counter substrate 800b including a counter electrode 5, a color filter 13, and a light-shielding film 14 provided on an insulation plate 6b. The active-matrix substrate and the counter substrate 800b are attached to each other with a liquid crystal layer 15 interposed therebetween.

As shown in FIGS. 9A and 9B, the active-matrix substrate 800a of the LCD device includes the TFTs 3 functioning as switching elements provided in a matrix on the insulation plate 6a. A gate 1c of each TFT 3 is a part of the gate line 1. The TFT 3 is driven by a signal input into the gate 1c of the TFT 3. A source 2c of the TFT 3 is branching from the data line 2. A video signal (a display signal) is input from the source 2c of the TFT 3. Each of the gate lines 1 and each of the data lines 2 are provided so as to cross each other. A drain 806 of the TFT 3 is branching from the drain electrode 4. The drain electrode 4 and a storage capacitor line 8 face each other with a gate insulation film 7 (FIG. 9B) interposed therebetween. At the portion where the drain electrode 4, the gate insulation film 7 and the storage capacitor line 8 overlap, a storage capacitor is formed.

In the thus configured LCD device, the drain electrode 4 in the active-matrix substrate 800a and the counter electrode 5 in the counter substrate 800b are driven so as to apply an electric field to the liquid crystal layer 15 in a direction perpendicular to the surfaces of the insulation plates 6a and 6b (FIG. 8). Hereinafter, an LCD device in which an electric field is applied to the liquid crystal layer in a direction perpendicular to the surfaces of the insulation plates 6a and 6b (FIG. 8) will be referred to as an LCD device with a vertical electric field driving system.

An LCD device generally has a problem of a narrow range of viewing angles. For example, inversion and reduction in the contrast ratio are caused in accordance with the angle at which a viewer watches the display screen (viewing angle). Such phenomena are caused because the angle between the light transmitted through the liquid crystal layer and the principal axis of the liquid crystal molecules varies in accordance with the viewing direction, resulting in birefringence anisotropy of the liquid crystal material.

In the above-described LCD device with the vertical electric field driving system, for example as shown in FIG. 8, an electric field E1 is applied to the liquid crystal layer 15 in a direction perpendicular to the surfaces of the insulation plates 6a and 6b, thereby orienting the principal axis of liquid crystal molecules 16 along a direction perpendicular to the insulation plates 6a and 6b. In this manner, light transmittance is controlled. Thus, the angle between the light transmitted through the liquid crystal layer and the principal axis of the liquid crystal molecules significantly varies in accordance with the viewing direction. As a result, in the LCD device with the vertical electric field driving system, the contrast ratio greatly varies in accordance with the viewing direction, thus narrowing the range of viewing angles.

In order to realize a wider range of viewing angles by preventing the inversion and the reduction in the contrast ratio, various attempts have been made. For example, Japanese Laid-Open Patent Publication No. 7-36058 discloses an LCD device in which an electric field is applied to the liquid crystal layer in a direction parallel to the surfaces of the substrates. Hereinafter, an LCD device in which an electric field is applied to the liquid crystal layer in a direction parallel to the substrates will be referred to as an LCD device with a horizontal electric field driving system.

In the LCD device with the horizontal electric field driving system, an electric field is applied to the liquid crystal layer in a direction parallel to the surfaces of the insulation plates 6a and 6b, thus rotating liquid crystal molecules in a plane parallel to the surfaces of the insulation plates 6a and 6b. In this manner, light transmittance is controlled. Accordingly, the angle between the light transmitted through the liquid crystal layer and the principal axis of the liquid crystal molecules is maintained regardless of the viewing direction. As a result, according to the LCD device with the horizontal electric field driving system, the contrast ratio is maintained regardless of the viewing direction, thus realizing a wider range of viewing angles. However, the LCD device with the horizontal electric field driving system has a complicated arrangement of lines as compared with the LCD device with the vertical electric field driving system, thus resulting in a low aperture ratio.

As described above, the LCD device with the vertical electric field driving system has a simple structure and a high aperture ratio, but has a disadvantage in the narrow range of viewing angles. On the other hand, the LCD device with the horizontal electric field driving system has a wider range of viewing angles, but has disadvantages in the complicated structure and the low aperture ratio.

As to viewing angles of LCD devices, a wider range of viewing angles is generally considered to be preferable. However, in the case where a notebook computer is used in an airplane or in a train, the user sometimes does not want others to see the display screen. In this case, a narrow range of viewing angles is more preferable.

However, in the conventional LCD devices, a range of viewing angles is determined by the structure and the kinds of liquid crystal materials used. Therefore, it is impossible for a user to change the viewing angle characteristics of a conventional LCD device in accordance with a desired use and the specific conditions encountered with such a use.

SUMMARY OF THE INVENTION

According to one aspect of this invention, a liquid crystal display device includes: a first plate and a second plate; a liquid crystal layer provided between the first plate and the second plate; an interlayer insulation film provided between the first plate and the liquid crystal layer; a first electrode provided on a first face of the interlayer insulation film, a second electrode and a third electrode provided on a second face of the interlayer insulation film; and a counter electrode provided between the second plate and the liquid crystal layer. The first electrode and the counter electrode face each other in a first direction. The second electrode and the third electrode are provided in a picture element area at equal intervals in an alternate manner in a second direction perpendicular to the first direction.

In one embodiment of the present invention, a liquid crystal display device further includes: a data line and at least two gate lines provided between the first plate and the interlayer insulation film for the picture element area; a first switching element electrically coupled to one of the gate lines; and a second switching element electrically coupled to the other gate line. The data line and the at least two gate lines cross each other. The first electrode is connected to the data line via the first switching element. The second electrode is connected to the data line via the second switching element.

In another embodiment of the present invention, at least one of the second electrode and the third electrode covers at least one of a gap between each of the at least two gate lines and the first electrode and a gap between the data line and the first electrode, thereby shielding light transmitted through the gap.

In still another embodiment of the present invention, the first electrode covers at least one of: a gap between each of the at least two gate lines and the second electrode, a gap between each of the at least two gate lines and the third electrode; a gap between the data line and the second electrode; and a gap between the data line and the third electrode, thereby shielding light transmitted through the gap.

In still yet another embodiment of the present invention, the interlayer insulation film is formed of a synthetic resin.

In still yet another embodiment of the present invention, the interlayer insulation film is formed of a photosensitive acrylic resin.

In still yet another embodiment of the present invention, the interlayer insulation film has a thickness of about 1 $\mu$m to about 10 $\mu$m.

In still yet another embodiment of the present invention, a liquid crystal display device further includes: at least two data lines and a gate line provided between the first plate and the interlayer insulation film for the picture element area; a first switching element connected to one of the data lines; and a second switching element connected to the other data line. The at least two data lines and the gate line cross each other. The first electrode is connected to one of the data lines via the first switching element. The second electrode is connected to the other data line via the second switching element.

In still yet another embodiment of the present invention, at least one of the second electrode and the third electrode covers at least one of a gap between each of the at least two gate lines and the first electrode and a gap between the data line and the first electrode, thereby shielding light transmitted through the gap.

In still yet another embodiment of the present invention, the first electrode covers at least one of: a gap between each of the at least two gate lines and the second electrode; a gap between each of the at least two gate lines and the third electrode; a gap between the data line and the second electrode; and a gap between the data line and the third electrode, thereby shielding light transmitted through the gap.

According to another aspect of this invention, a liquid crystal display device includes: a first plate and a second plate; a liquid crystal layer provided between the first plate and the second plate; an interlayer insulation film provided between the first plate and the liquid crystal layer; a first electrode provided on a first face of the interlayer insulation film; a second electrode and a third electrode provided on a second face of the interlayer insulation film; and a counter electrode provided between the second plate and the liquid crystal layer. The first electrode and the counter electrode face each other in a first direction. The second electrode and the third electrode are provided in a picture element area at equal intervals in an alternate manner in is a second direction perpendicular to the first direction. A method for driving the liquid crystal display device includes the step of applying a different potential to each electrode of one of a pair of the first electrode and the counter electrode and a pair of the second electrode and the third electrode and applying an identical potential to each electrode of the other pair.

According to the present invention, an electric field substantially having a perpendicular component with respect to the surfaces of the insulation plates is applied to the liquid crystal layer by the first electrode and the counter electrode provided so as to face each other. On the other hand, an electric field substantially having a parallel component with respect to the surfaces of the insulation plates is applied to the liquid crystal layer by the second and the third electrodes provided so as to be isolated from each other. The first electrode and the second and the third electrodes are provided with the interlayer insulation film interposed therebetween. Moreover, the counter electrode is provided in a substrate which is different from the one in which the other electrodes are provided. Thus, each of the electrodes can be controlled separately.

Each picture element area includes a data line and two or more gate lines. At least one of the two or more gate lines is connected to the first electrode via the first TFT and the other gate line or lines are connected to the second electrode via the second TFT. The above-described configuration makes it possible to independently control the potential of each of the electrode without increasing the number of data lines. Alternatively, each picture element area includes a gate line and two or more data lines. At least one of the two or more data lines is connected to the first electrode via the first TFT and the other data line or lines are connected to the second electrode via the second TFT. This configuration makes it possible to independently control a potential of each of the electrodes without increasing the number of gate lines.

The second electrode or the third electrode is provided so as to overlap a gap between the first electrode and the lines (e.g., the gate line and the data line). As a result, light leaking through the gap is shielded by the second electrode or the third electrode. Alternatively, the first electrode is provided so as to overlap a gap between the second electrode and the lines or a gap between the third electrode and the lines. Thus, light leaking through the gap is shielded by the first electrode.

The interlayer insulation film provided between the first electrode and the second and the third electrodes can be easily formed by using, for example, a synthetic resin such as a photosensitive acrylic resin.

When the thickness of the interlayer insulation film is in the range of about 1 μm to about 10 μm, a satisfactory device quality can be obtained. Moreover, high-quality products can be produced with an easy production process.

In order to drive the LCD device, a different potential is applied to each of the first electrodes and counter electrode while the same potential is applied to each of the second electrode and third electrodes. As a result, an electric field substantially having a perpendicular component with respect to the surfaces of the insulation plates is applied to the liquid crystal layer. On the other hand, in the case where a different potential is applied to each of the second electrode and third electrodes while the same potential is applied to the first electrodes and the counter electrode, an electric field substantially having a parallel component with respect to the surfaces of the insulation plates is applied to the liquid crystal layer.

Thus, the invention described herein makes possible the advantage of providing an LCD device capable of controlling its viewing angle characteristics, and a method for driving the same.

These and other advantages of the present invention will become apparent to those skilled in the art upon reading and understanding the following detailed description with reference to the accompanying figures.

DESCRIPTION OF THE PREFERRED EMBODIMENTS

Figure 8:
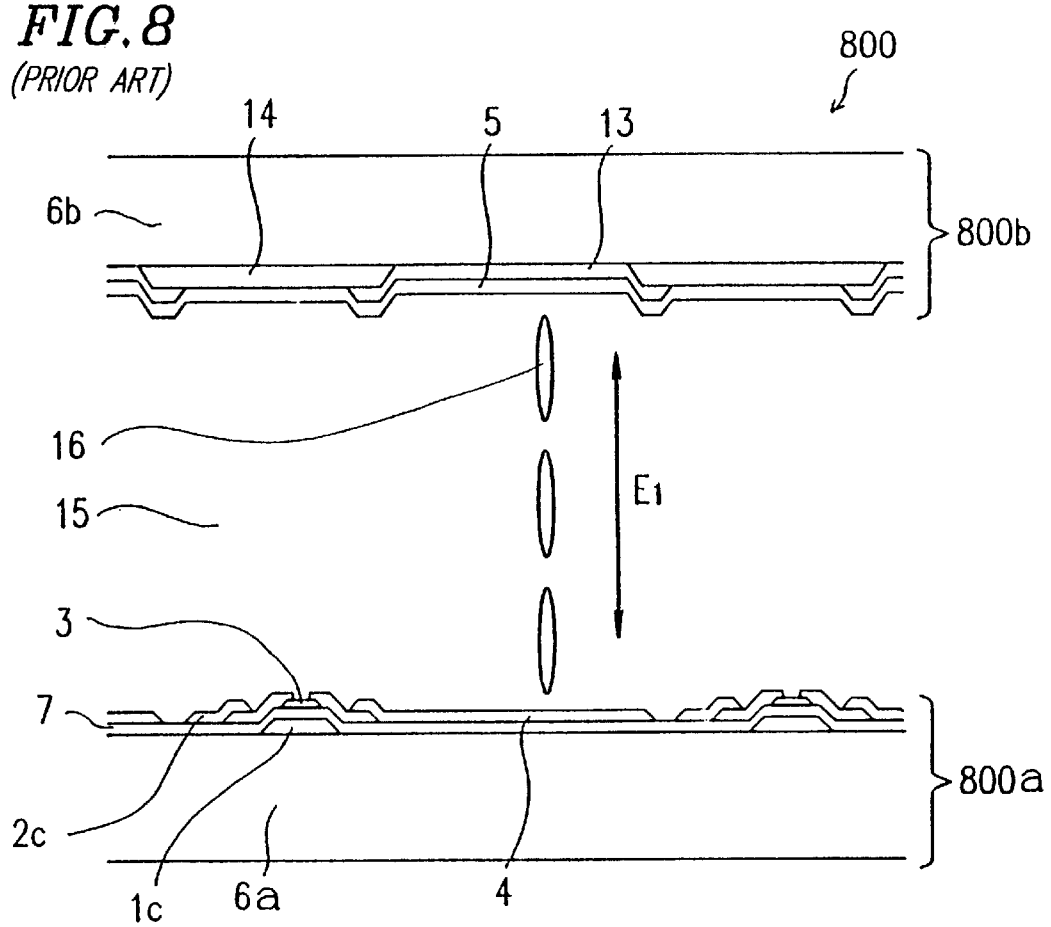
FIG. 8 is a cross-sectional view illustrating an exemplary configuration of A conventional LCD devices.
Figure 9A:
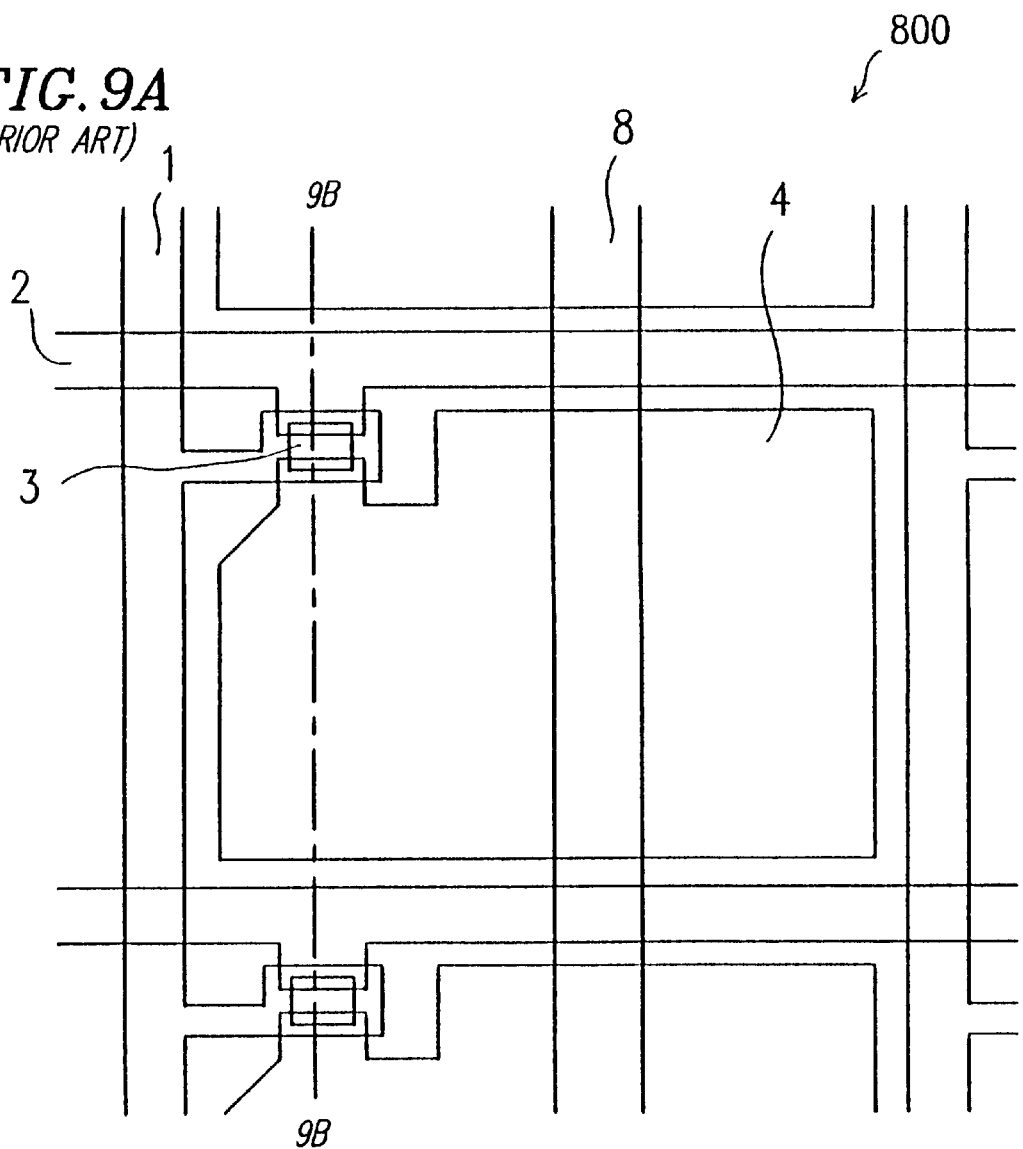
FIG. 9A is a plan view of an active-matrix substrate of the conventional LCD device shown in FIG. 8.
Figure 9B:
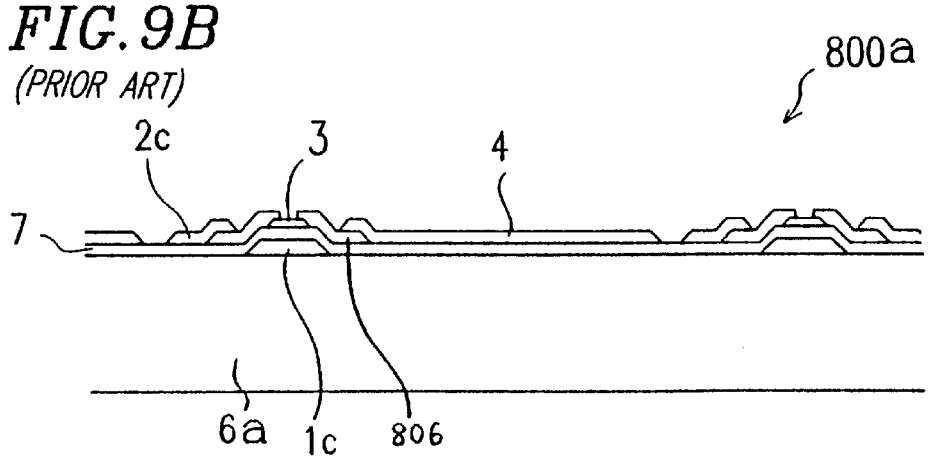
FIG. 9B is a cross-sectional view of the active-matrix substrate taken along line 9B–9B' in FIG. 9A.

Hereinafter, the present invention will be described by way of illustrative, but non-limiting examples with reference to the accompanying drawings. In figures described below, elements identical to those in the conventional LCD device discussed with reference to FIGS. 8, 9A, and 9B will bear identical reference numerals therewith.

EXAMPLE 1

Figure 1A:
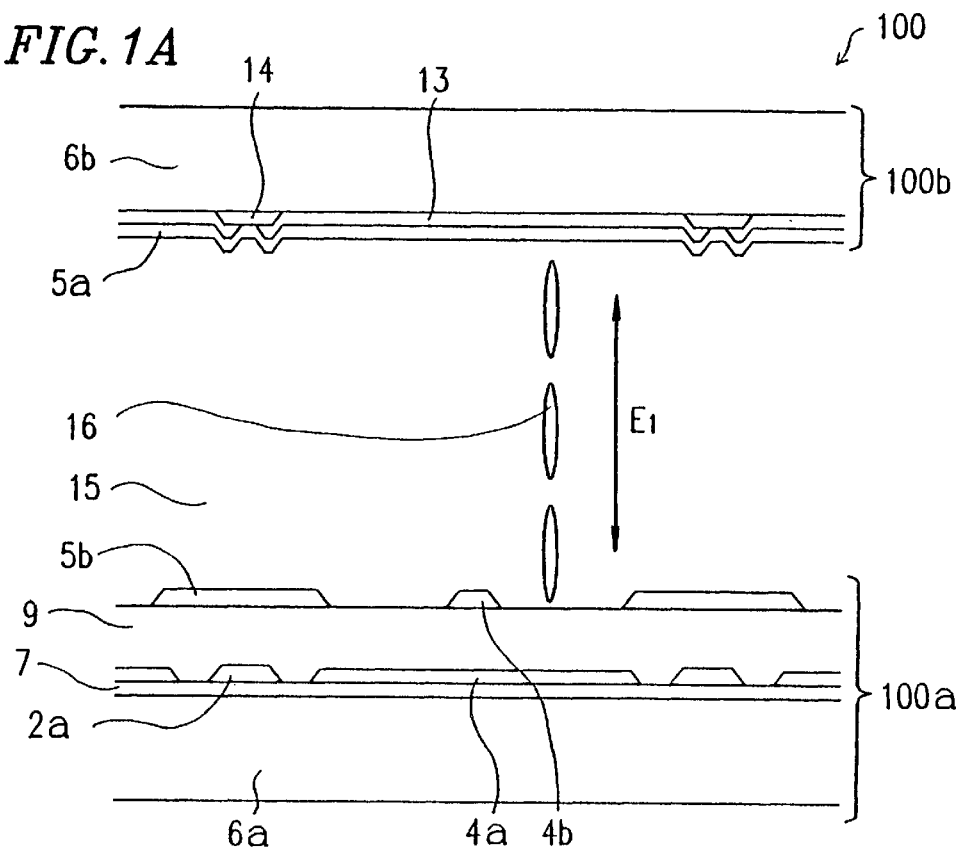
FIG. 1A is a cross-sectional view of an LCD device with a vertical electric field driving system in Example 1 according to the present invention.
Figure 1B:
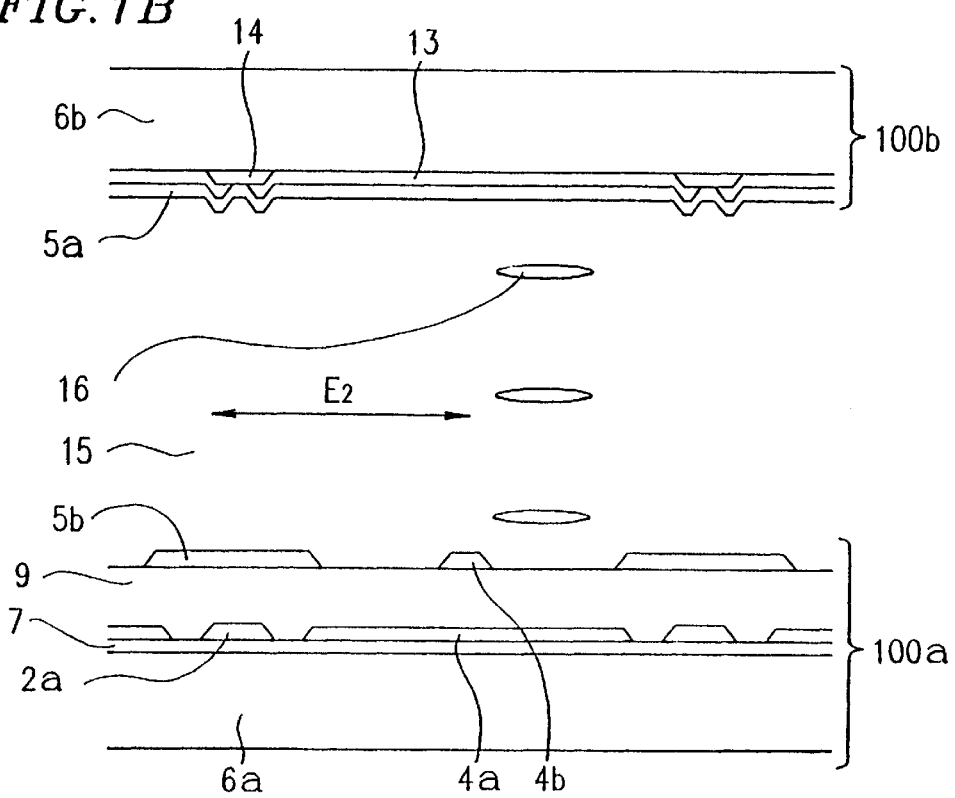
FIG. 1B is a cross-sectional view of an LCD device with a horizontal electric field driving system in Example 1 according to the present invention.
Figure 2A:
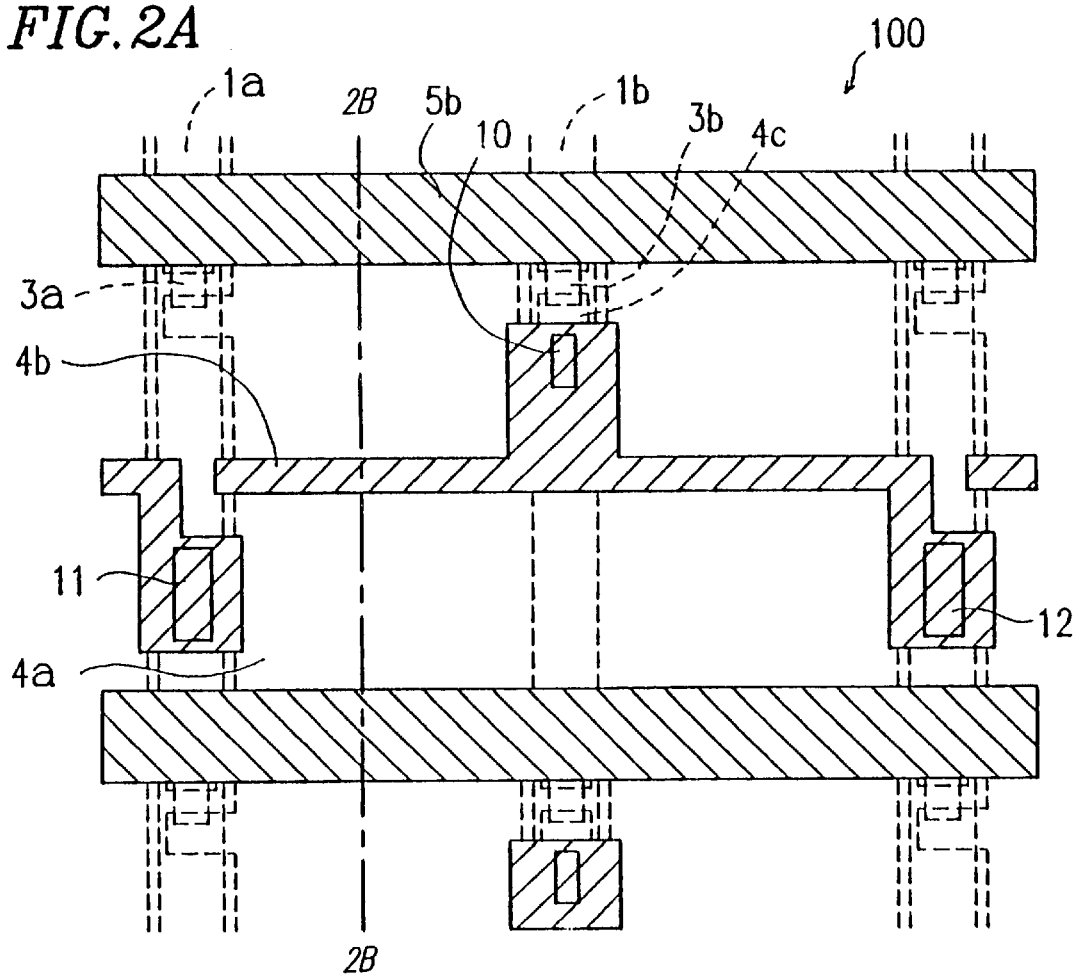
FIG. 2A is a plan view of an active-matrix substrate of the LCD device in Example 1 according to the present invention.
Figure 2B:
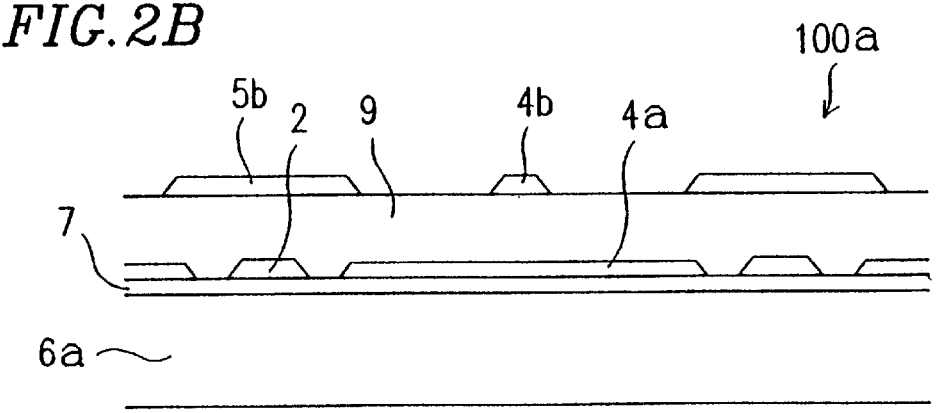
FIG. 2B is a cross-sectional view of the active-matrix substrate taken along line 2B–2B' in FIG. 2A.

FIGS. 1A and 1B are cross-sectional views showing configurations of an LCD device 100 in Example 1 according to the present invention. FIG. 2A is a plan view showing a configuration of one picture element area of an active-matrix substrate of the LCD device shown in FIGS. 1A and 1B. FIG. 2B is a cross-sectional view of the active-matrix substrate taken along line A–A' in FIG. 2A.

As shown in FIGS. 1A and 1B, the LCD device 100 includes the active-matrix substrate 100a and a counter substrate 100b with a liquid crystal layer 15 interposed therebetween.

A first drain electrode 4a in the active-matrix substrate 100a and a counter electrode 5a in the counter substrate 100b are provided so as to face each other with the liquid crystal layer 15 interposed therebetween. As a result, an electric field E1 substantially having a perpendicular component with respect to the surfaces of insulation plates 6a and 6b can be applied to the liquid crystal layer 15. Furthermore, an upper layer second drain electrode 4b and a third electrode 5b are provided above the first drain electrode 4a with an interlayer insulation film 9 interposed therebetween. The upper layer second drain electrode 4b and the third electrode 5b are provided so as to be isolated from each other on the interlayer insulation film 9. As a result, an electric field E2 substantially having a parallel component with respect to the surfaces of the insulation plates 6a and 6b can be applied to the liquid crystal layer 15.

Hereinafter, an exemplary configuration of one picture element area of the active-matrix substrate 100a will be described.

As shown in FIGS. 1A and 1B, and the counter substrate 100b and the active-matrix substrate 100a are attached to each other with the liquid crystal layer 15 interposed therebetween.

Figure 3A:
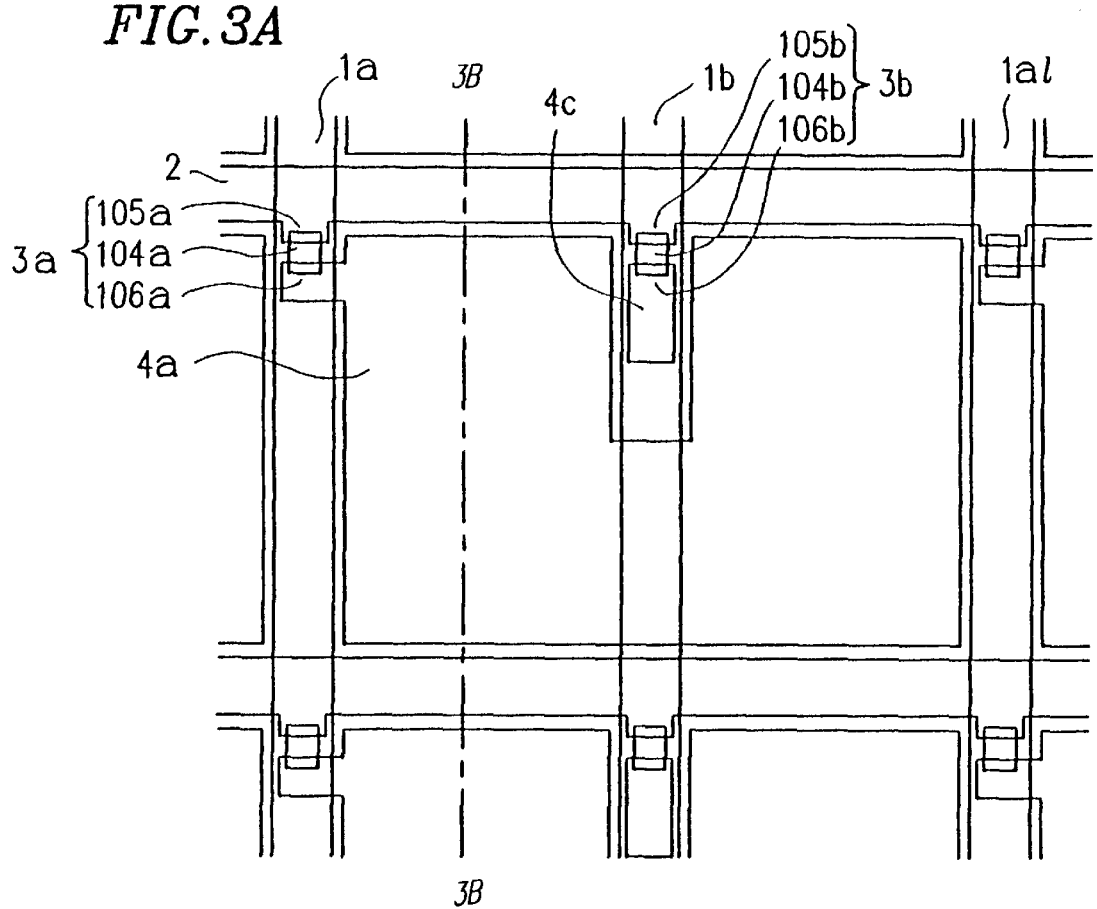
FIG. 3A is a plan view illustrating a production step of the active-matrix substrate of the LCD device in Example 1 according to the present invention.
Figure 3B:
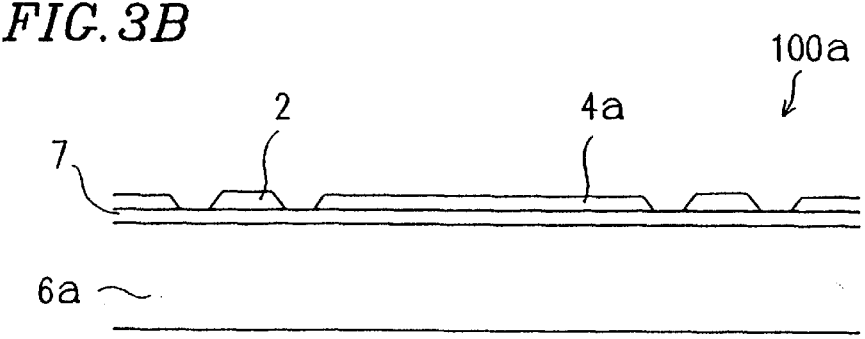
FIG. 3B is a cross-sectional view of the active-matrix substrate taken along line 3B–3B' in FIG. 3A.

As shown in FIGS. 3A and 3B, the active-matrix substrate 100a includes a first gate line 1a and a second gate line 1b provided on the insulation plate 6a made of glass or the like. A gate insulation film 7 is provided so as to cover the insulation plate 6a and the gate lines 1a and 1b. Provided on the gate insulation film 7 are a semiconductor layer 104a of a first TFT 3a opposing a part of the first gate line 1a and a semiconductor layer 104b of a second TFT 3b opposing a part of the second gate line 1b.

Also provided on the gate insulation film 7 are a data line 2, a source 105a of the first TFT 3a and a source 105b of the second TFT 3b both branching from the data line 2, a lower layer second drain electrode 4c, and the first drain electrode 4a. The first drain electrode 4a is provided so as to cross the second gate line 1b. The first gate line 1a and the second gate line 1b cross the data line 2 with the gate insulation film 7 interposed therebetween, As shown in FIGS. 2A and 2B, the interlayer insulation film 9 is provided so as to cover the data line 2, the first TFT 3a, the second TFT 3b, the first drain electrode 4a, and the lower layer second drain electrode 4c. The upper layer second drain electrode 4b and the third electrode 5b are provided on the interlayer insulation film 9. Provided in the interlayer insulation film 9 are a contact hole 10 for electrically connecting the lower layer second drain electrode 4c with the upper layer second drain electrode 4b, and a contact hole 11 for providing a storage capacitor 12 between the upper layer second drain electrode 4b and the first gate line 1a1 adjacent to the gate line 1a.

The upper layer second drain electrode 4b and the third electrode 5b are provided so as to be isolated from each other on the interlayer insulation film 9, and to be arranged in a picture element area at equal intervals in an alternate manner. The upper layer second drain electrode 4b and the third electrode 5b each extend in a direction parallel to the data line 2. The upper layer second drain electrode 4b and the third electrode 5b are formed so as to overlap a peripheral edge of the first drain electrode 4a and a peripheral edge of each of the lines 1a, 1b, and 2 (FIG. 3A) with the interlayer insulation film 9 interposed therebetween and thus cover gaps between the first drain electrode 4a and the lines 1a, 1b, and 2.

A gate 103a of the first TFT 3a is a part of the first gate line 1a and a gate 103a of the second TFT 3b is a part of the second gate line 1b. On the other hand, the source 105a of the first TFT 3a and the source 105b of the second TFT 3b are branching from the data line 2 (FIG. 3A). A drain 106a of the first TFT 3a is branching from the first drain electrode 4a. The lower layer second drain electrode 4c is connected to the upper layer second drain electrode 4b via the contact hole 10. As a result, the drain 106b of the second TFT 3b is connected to the upper layer second drain electrode 4b.

Thus, the first drain electrode 4a is connected to the data line 2 via the first TFT 3a, and the second drain electrode 4b is connected to the data line 2 via the second TFT 3b.

Moreover, the first drain electrode 4a is provided so as to cross the second gate line 1b with the gate insulation film 7 sandwiched therebetween. The portion where the first drain electrode 4a, the gate insulation film 7 and the second gate line 1b overlap forms a storage capacitor. On the other hand, the storage capacitor 12 is formed between the second drain electrode 4b and the first gate line 1a1 via the gate insulation film 7 through the contact hole 11 of the interlayer insulation film 9. Also provided is an alignment film (not shown) which covers the interlayer insulation layer 9, the second drain electrode 4b and the third electrode 5b.

As shown in FIGS. 1A and 1B, the counter substrate 100b includes the counter electrode 5a, a color filter 13, and a light-shielding film 14 provided on the insulation plate 6b. An alignment film (not shown) is formed on the surface of the counter electrode 5a contacting with the liquid crystal layer 15.

Figure 4A:
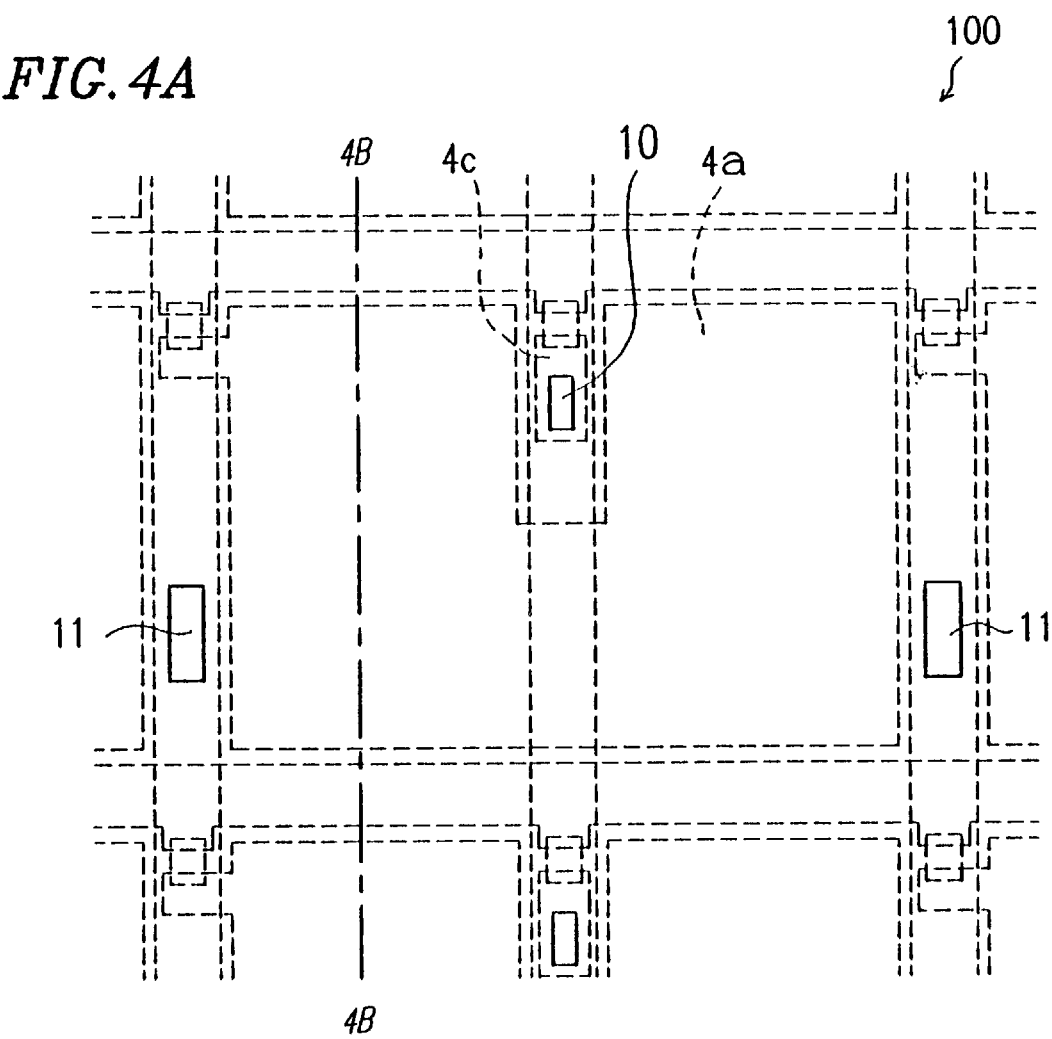
FIG. 4A is a plan view illustrating a production step of the active-matrix substrate of the LCD device in Example 1 according to the present invention.

Next, a method for producing the above-described LCD device will be described with reference to FIGS. 2A, 2B, 3A, 3B, 4A and 4B. FIGS. 3A and 4A are plan views corresponding to FIG. 3A, and FIGS. 3B and 4B are cross-sectional views corresponding to FIG. 2B.

First, the active-matrix substrate 100a is produced, for example, in the following manner. As shown in FIGS. 3A and 3B, the first gate line 1a and the second gate line 1b are formed on the insulation plate 6a made of glass or the like. The gate insulation film 7 is formed so as to cover the insulation plate 6a and the first and second gate lines 1a and 1b. Next, the semiconductor layer 104a to be included in the first TFT 3a is formed so as to oppose a part of the first gate line 1a, and the semiconductor layer 104b to be included in the second TFT 3b is formed so as to oppose a part of the second gate line 1b. Thereafter, the data line 2, the source 105a to be included in the first TFT 3a and the source 105b to be included in the second TFT 3b both branching from the data line 2, the lower layer second drain electrode 4c and the first drain electrode 4a are formed. The first drain electrode 4a is formed so as to cross the second gate line 1b. The above-described steps can be performed by using the same materials and processes as in any production method for conventional LCD devices.

Figure 4B:
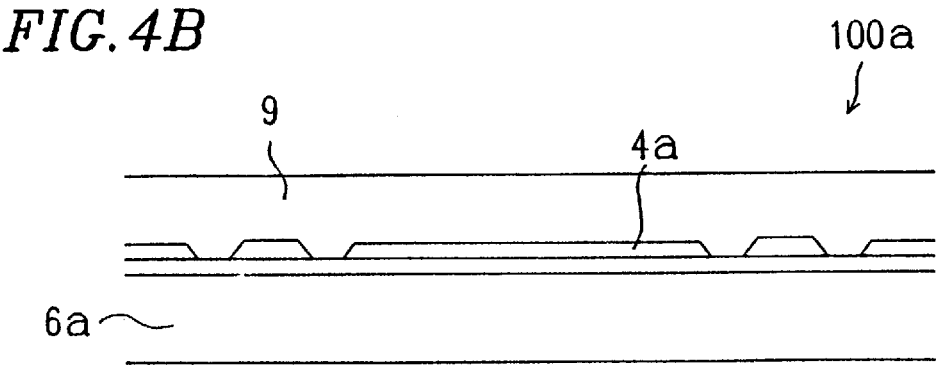
FIG. 4B is a cross-sectional view of the active-matrix substrate taken along line 4B–4B' in FIG. 4A.

Next, as shown in FIGS. 4A and 4B, the interlayer insulation film 9 is formed on the gate insulation film 7 so as to cover the data line 2, the first TFT 3a, the second TFT 3b, the first drain electrode 4a and the lower layer second drain electrode 4c. The contact hole 10 for electrically connecting the lower layer second drain electrode 4c with the upper layer second drain electrode 4b (FIG. 2A) and the contact hole 11 for providing the storage capacitor 12 between the upper layer second drain electrode 4b and the first gate line 1a are formed by patterning. According to Example 1, a photosensitive acrylic resin is deposited to a thickness of about 3 μm to form the interlayer insulation film 9. The formation of the interlayer insulation film 9 having the contact holes 10 and 11 is as follows. First, a photosensitive acrylic resin in a liquid state is applied to the gate insulation film 7 by a spin-coating. Then, the photosensitive acrylic resin is exposed to light by photolithography and developed by an alkaline solution for pattering. In this manner, the interlayer insulation film 9 having the contact holes 10 and 11 running therethrough is formed.

Thereafter, as shown in FIGS. 2A and 2B, the upper layer second drain electrode 4b and the third electrode 5b, which are isolated from each other, are formed on the interlayer insulation film 9. The upper layer second drain electrode 4b and the third electrode 5b are formed so as to overlap the periphery of the first drain electrode 4a and the peripheries of the lines 1a, 1b, and 2 with the interlayer insulation film 9 interposed therebetween and thus cover a gap between the first drain electrode 4a and the lines 1a, 1b, and 2.

On the other hand, the counter substrate 100b is formed by laminating the light-shielding film 14, the color filter 13, and the counter electrode 5a on the insulation plate 6b in this order (FIGS. 1A and 1B).

Thereafter, the alignment films are formed: (1) on the interlayer insulation film 9 so as to cover the upper layer second drain electrode 4b and the third electrode 5b; and (2) on the surface of the counter electrode 5a; and are rubbed. The rubbing direction is determined so that the angle formed by the principal axis of liquid crystal molecules 16 and the longitudinal direction (a direction parallel to the data lines) of the upper layer second drain electrode 4b, and the third electrode 5b is 45°.

Finally, as shown in FIGS. 1A and 1B, the active-matrix substrate 100a and the counter substrate 100b are attached to each other so that the first drain electrode 4a and the counter electrode 5a face each other. A liquid crystal material is injected into the space between the two substrates 100a and 100b and the injection hole is sealed to form the liquid crystal layer 15 between the two substrates 100a and 100b. In this manner, the LCD device 100 is completed.

Hereinafter, a method for driving the LCD device 100 will be described.

As shown in FIGS. 2A and 2B, the above-described active-matrix substrate 100a includes the first gate line 1a and the second gate line 1b connected to the first TFT 3a and the second TFT 3b, respectively. Thus, the time required for writing signals is set to be one-half of the time required in the conventional LCD device. By turning "ON" the TFTs 3a and 3b at different times, signals are input to the first drain electrode 4a and the upper layer second drain electrode 4b, separately.

For example, as shown in FIG. 1A, by providing the first drain electrode 4a with a potential which is different from that of the counter electrode 5a, the electric field E1 substantially having a perpendicular component with respect to the surfaces of the insulation plates 6a and 6b is applied to the liquid crystal layer 15. At the same time, as shown in FIG. 1B, by providing the upper layer second drain electrode 4b with the same potential as that of the third electrode 5b, the electric field E2 substantially having a parallel component with respect to the surfaces of the insulation plates 6a and 6b is not applied to the liquid crystal layer 15. As a result, the liquid crystal molecules 16 are aligned so that the principal axis of the liquid crystal molecules 16 is perpendicular to the surfaces of the insulation plates 6a and 6b. In this case, the angle formed by the light transmitted through the liquid crystal layer 15 and the principal axis of the liquid crystal molecules 16 varies in accordance with the viewing direction, Therefore, the range of viewing angles in the LCD device is narrowed.

Alternatively, by providing the first drain electrode 4a with the same potential as that of the counter electrode 5a, the electric field E1 substantially having a perpendicular component with respect to the surfaces of the insulation plates 6a and 6b is not applied to the liquid crystal layer 15. At the same time, by providing the upper layer second drain electrode 4b with a potential which is different from that of the third electrode 5b, the electric field E2 substantially having a parallel component with respect to the surfaces of the insulation plates 6a and 6b is applied to the liquid crystal layer 15. As a result, the liquid crystal molecules 16 rotate in a plane parallel to the surfaces of the insulation plates 6a and 6b. In this case, the angle formed by the light transmitted through the liquid crystal layer 15 and the principal axis of the liquid crystal molecules 16 is maintained regardless of the viewing direction. Therefore, the range of viewing angles in the LCD device is broadened.

Thus, according to the LCD device of Example 1, it is possible to control the direction of the electric field applied to the liquid crystal layer 15. Therefore, the viewing angle characteristics can be changed in accordance with a desired use and the specific conditions encountered with such a use.

Moreover, according to the LCD device 100 of Example 1, two gate lines 1a and 1b are provided for one data line 2. As a result, there is no need for increasing the number of data lines in order to independently apply a potential to each of the drain electrodes.

Furthermore, according to the LCD device 100 of Example 1, the upper layer second drain electrode 4b and the third electrode 5b are formed so as to overlap the part of the periphery of the first drain electrode 4a and the parts of the peripheries of the lines 1a, 1b and 2 with the interlayer insulation film 9 interposed therebetween and thus cover gaps between the first drain electrode 4a and the lines 1a, 1b and 2. Thus, in the case where the upper layer second drain electrode 4b is formed of a metal such as Ta, light leaking through the gaps between the first drain electrode 4a and the lines 1a, 1b and 2 can be shielded due to the upper layer second drain electrode 4b serving as a light-shielding layer. As a result, the pattern of the light-shielding layer 14 included in the counter substrate 100b can be reduced, thereby further improving the aperture ratio of the LCD device.

EXAMPLE 2

Figure 5A:
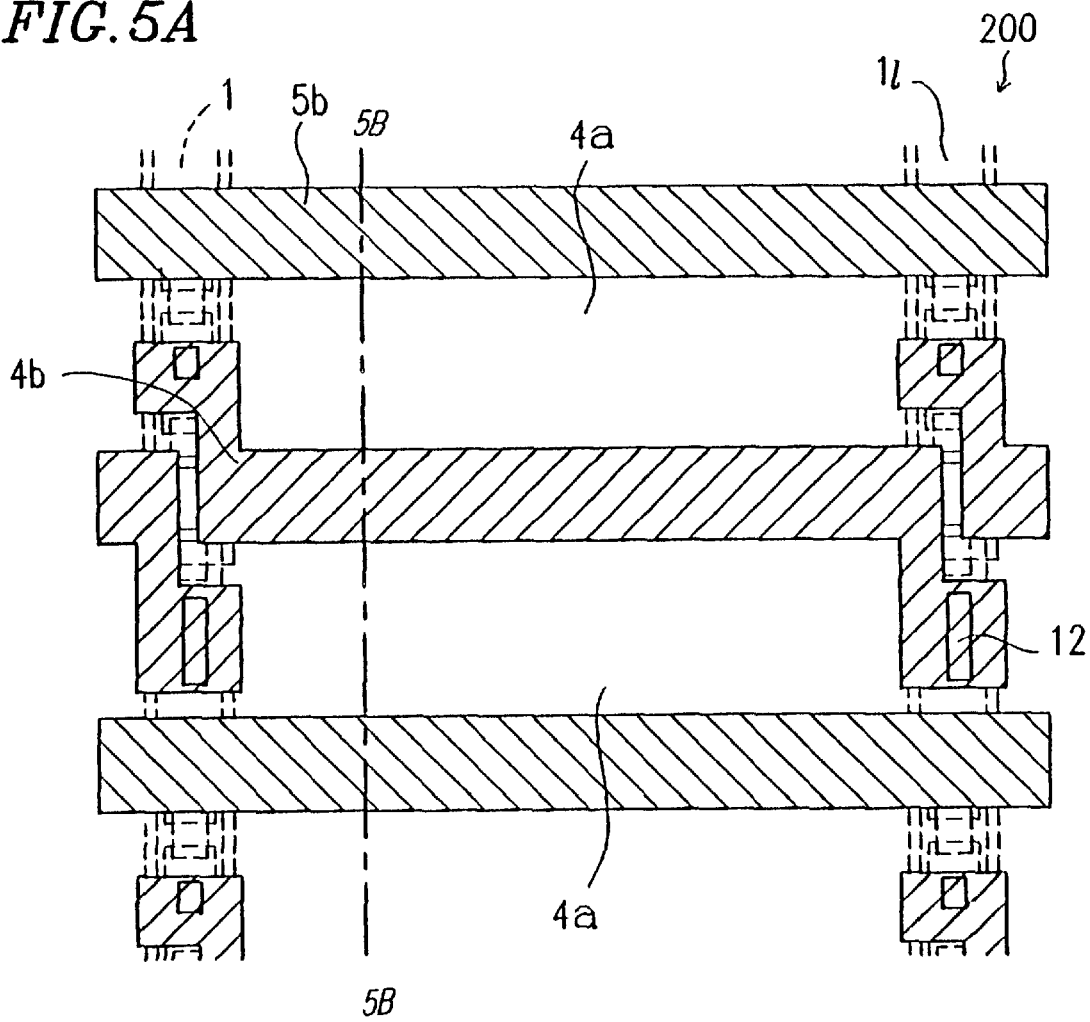
FIG. 5A is a plan view of an active-matrix substrate of an LCD device in Example 2 according to the present invention.
Figure 5B:
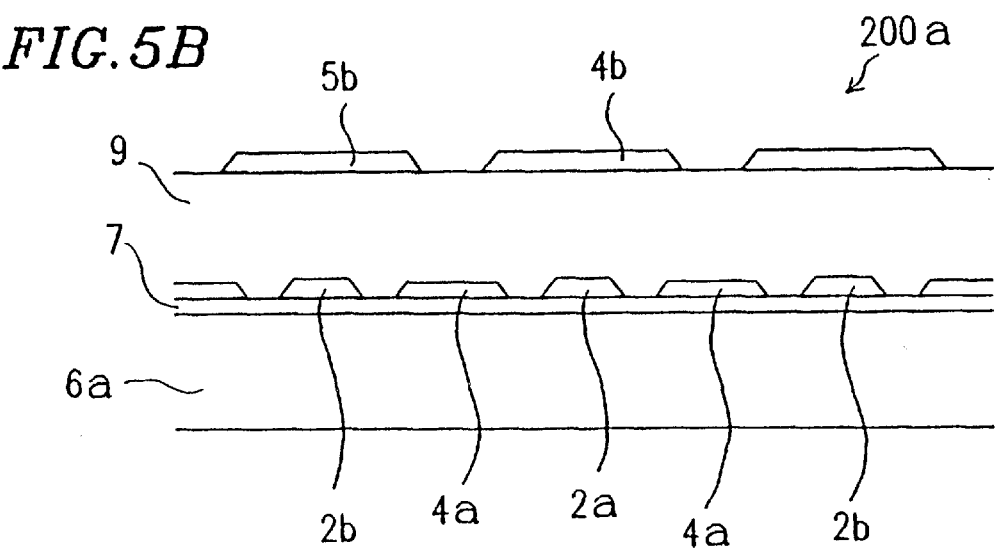
FIG. 5B is a cross-sectional view of the active-matrix substrate taken along line 6B–6B' in FIG. 5A.

FIG. 5A is a plan view showing a configuration of one picture element area of en active-matrix substrate 200a in an LCD device 200 of Example 2 according to the present invention. FIG. 5B is a cross-sectional view of the active-matrix substrate 200a taken along line 5B–5B' in FIG. 5A. The LCD device 200 includes the active-matrix substrate 200a and a counter substrate 200b. The counter substrate 200b has the same structure as in that of Example 1 shown in FIGS. 1A and 1B. As shown in FIGS. 1A and 1B, the active-matrix substrate 200a and the counter substrate 200b are attached to each other with the liquid crystal layer 15 interposed therebetween. Elements identical to those in FIGS. 1A and 1B will bear identical reference numerals therewith.

Two first drain electrodes 4a provided in the active-matrix substrate 200a and the counter electrode 5a provided in the counter substrate 200b are provided so as to face each other with the liquid crystal layer 15 interposed therebetween. As a result, the electric field E1 substantially having a perpendicular component with respect to the surfaces of the insulation plates 6a and 6b can be applied to the liquid crystal layer 15. On the other hand, the upper layer second drain electrode 4b and the third electrode 5b in the active-matrix substrate 200a are provided above the two first drain electrodes 4a with the interlayer insulation film 9 sandwiched therebetween. The upper layer second drain electrode 4b and the third electrode 5b are provided so as to be isolated from each other on the interlayer insulation film 9. As a result, the electric field E2 substantially having a parallel component with respect to the surfaces of the insulation plates 6a and 6b can be applied to the liquid crystal layer 15.

Hereinafter, an exemplary configuration for the active-matrix substrate 200a will be described.

In the same manner as in Example 1 shown in FIGS. 1A and 1B, the counter substrate 200b and the above-described active-matrix substrate 200a are attached to each other with the liquid crystal layer 15 interposed therebetween.

As shown in FIGS. 5A and 5B, the active-matrix substrate 200a includes a gate line 1 formed on an insulation plate 6a made of glass or the like. A gate insulation film 7 is provided so as to cover the insulation plate 6a and the gate line 1. Provided on the gate insulation film 7 are semiconductor layers 104a, 104a, and 104b opposing parts of the gate line 1.

Figure 6A:
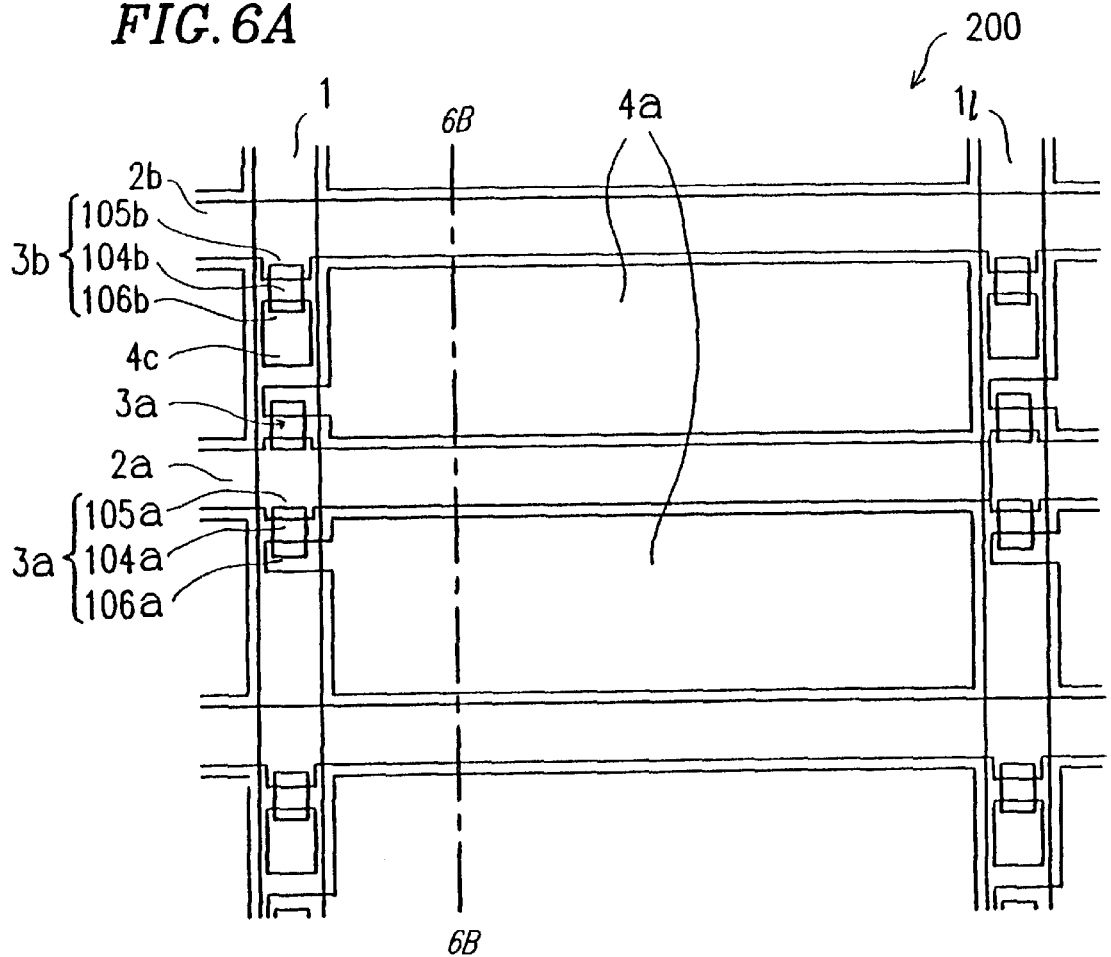
FIG. 6A is a plan view illustrating a production step of the active-matrix substrate of the LCD device in Example 2 according to the present invention.

Also provided on the gate insulation film 7 are a first data line 2a, a second data line 2b, two sources 105a of two first TFTs 3a, a source 105b of a second TFT 3b, two first drain electrodes 4a, and a lower layer second drain electrode 4c (FIG. 6A). The first data line 2a is disposed between the two first drain electrodes 4a, The gate line 1 crosses the first data line 2a and the second data line 2b with the gate insulation film 7 interposed therebetween.

An interlayer insulation film 9 is provided so as to cover the first data line 2a, the second data line 2b, the two first TFTs 3a, the second TFT 3b, the first drain electrodes 4a, and the lower layer second drain electrode 4c. Provided on the interlayer insulation film 9 are an upper layer second drain electrode 4b and a third electrode 5b. Provided in the interlayer insulation film 9 are a contact hole 10 for electrically connecting the lower layer second drain electrode 4c with the upper layer second drain electrode 4b and a contact hole 11 for providing a storage capacitor 12 between the upper layer second drain electrode 4b and the gate line 1.

The upper layer second drain electrode 4b and the third electrode 5b are provided so as to be isolated from each other on the interlayer insulation film 9. The upper layer second drain electrode 4b and the third electrode 5b each extend in a direction parallel to the data line 2. The upper layer second drain electrode 4b and the third electrodes 5b are provided so as to partially overlap a peripheral edge of the first drain electrode 4a and a peripheral edge of each of the lines (e.g., the gate line 1, the first data line 2a and the second data line 2b) with the interlayer insulation film 9 interposed therebetween and thus cover gaps between the first drain electrode 4a and the lines 1, 2a and 2b.

Two gates 103a of the two first TFTs 3a and a gate 103b of the second TFT 3b are parts of the gate line 1. The two sources 105a of the two first TFTs 3a are branching from the first data line 2a. On the other hand, the source 105b of the second TFT 3b is branching from the second data line 2b. Drains 106a of the two first TFTs 3a are branching from the two first drain electrodes 4a, respectively. A drain 106b of the second TFT 3b is connected to the upper layer second drain electrode 4b via the lower layer second drain electrode 4c at the contact hole 10 of the interlayer insulation film 9.

Accordingly, each of the two first drain electrodes 4a are connected to the first data line 2a via each of the first TFTs 3a, and the second drain electrode 4b is connected to the second data line 2b via the second TFT 3b.

The storage capacitor 12 is provided between the second drain electrode 4b and the gate line 1 via the gate insulation film 7 through the contact hole 11 of the interlayer insulation film 9. The active-matrix substrate 200a also includes an alignment film (not shown).

In the same manner as in Example 1 shown in FIGS. 1A and 1B, the counter substrate 200b includes a counter electrode 5a, a color filter 13, and a light-shielding film 14 provided on an insulation plate 6b. Provided on the surface of the counter electrode 5a contacting the liquid crystal layer 15 is an alignment film (not shown).

Figure 6B:
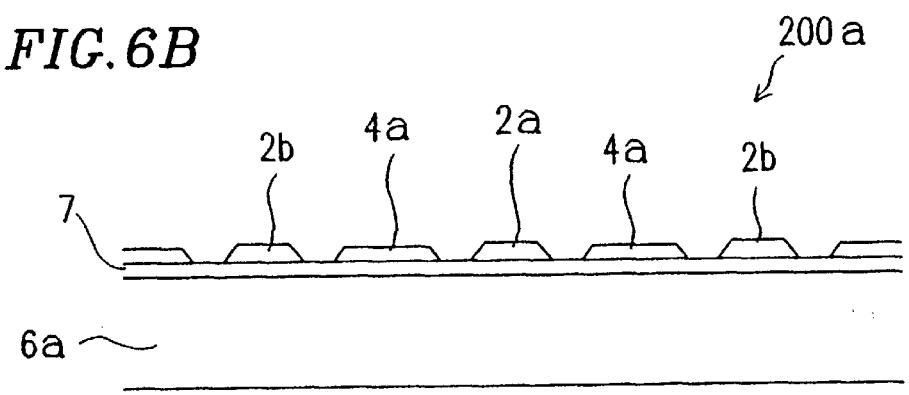
FIG. 6B is a cross-sectional view of the active-matrix substrate taken along line 6B–6B' in FIG. 6A.
Figure 7A:
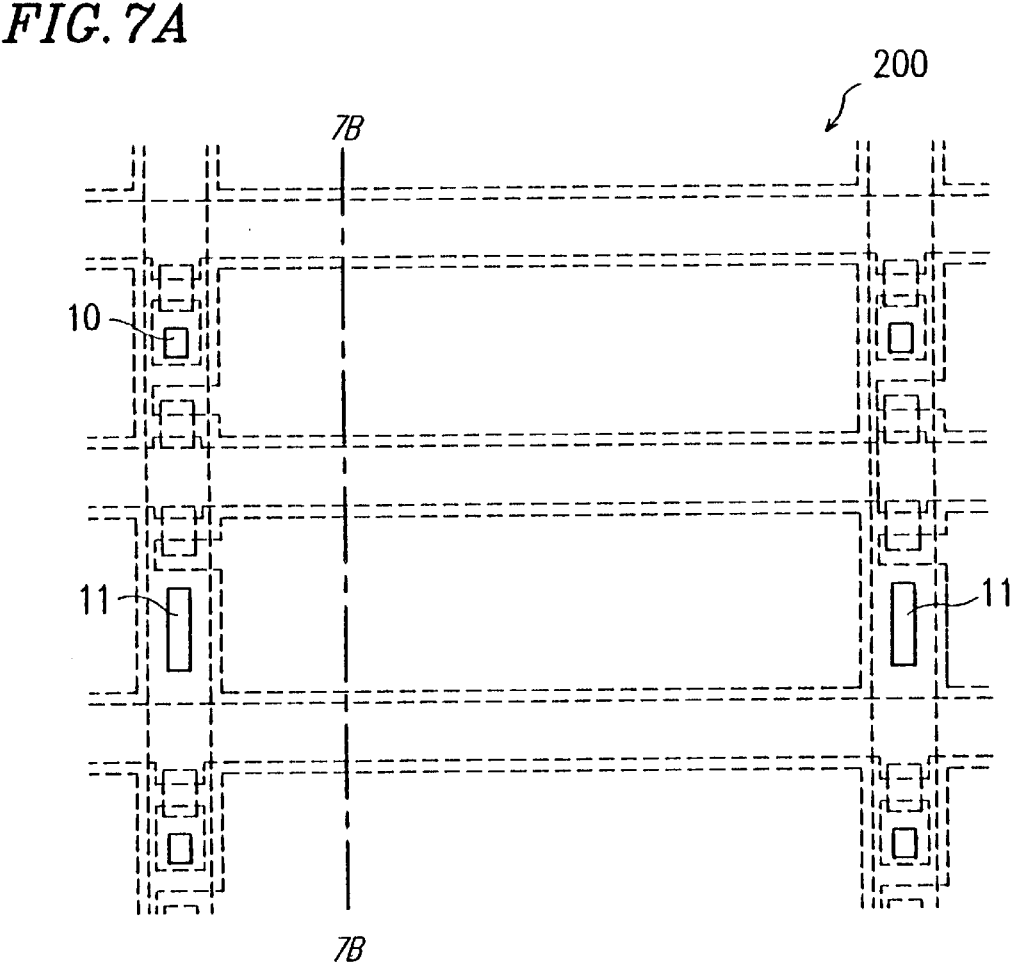
FIG. 7A is a plan view illustrating a production step of the active-matrix substrate of the LCD device in Example 2 according to the present invention.
Figure 7B:
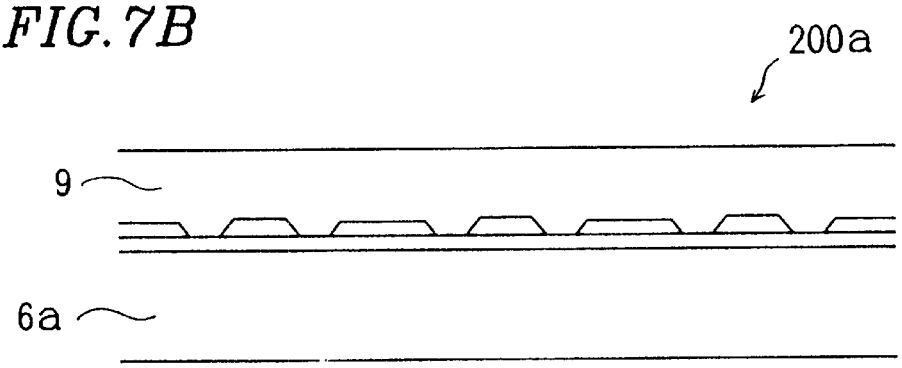
FIG. 7B is a cross-sectional view of the active-matrix substrate taken along line 7B–7B' in FIG. 7A.

Hereinafter, a method for producing the LCD device of Example 2 according to the present invention will be described with reference to FIGS. 5A, 5B, 6A, 6B, 7A, and 7B. FIGS. 6A and 7A are plan views corresponding to FIG. 2A, and FIGS. 6B and 7B are cross-sectional views corresponding to FIG. 2B.

First, the active-matrix substrate 200a is produced, for example, in the following manner. As shown in FIGS. 6A and 6B, the gate line 1 is formed on the insulation plate 6a made of glass or the like. The gate insulation film 7 is formed so as to cover the insulation plate 6a and the gate line 1. Then, the two semiconductor layers 104a to be included in the two first TFTs 3a and the semiconductor layer 104b to be included in the second TFT 3b are formed so as to oppose to parts of the gate line 1. Thereafter, the first data line 2a, the two sources 105a to be included in the two first TFTs 3a both branching from the first data line 2a, the second data line 2b, the source 105b to be included in the second TFT 3b branching from the second data line 2b, the lower layer second drain electrode 4c and the two first drain electrodes 4a are formed. The two first drain electrodes 4a are formed so as to be separated by the first data line 2a. The above-described steps can be performed by using the same materials and processes as in any production method for conventional LCD devices Next, as shown in FIGS. 7A and 7B, the interlayer insulation film 9 is formed on the gate insulation film 7 so as to cover the first data line 2a, the second data line 2b, the two first TFTs 3a, the second TFT 3b, the first drain electrodes 4a, and the lower layer second drain electrode 4c. Then, the contact hole 10 for electrically connecting the lower layer second drain electrode 4c with the upper layer second drain electrode 4b and the contact hole 11 for providing the storage capacitor 12 between the upper layer second drain electrode 4b and the gate line 1 are formed by patterning. According to Example 2, a photosensitive acrylic resin is deposited to a thickness of about 3 μm to form the interlayer insulation film 9, and the contact holes 10 and 11 are formed by patterning in the same manner as in Example 1.

Thereafter, as shown in FIGS. 5A and 5B, the upper layer second drain electrode 4b and the third electrode 5b are formed so as to be isolated from each other on the interlayer insulation film 9. The upper layer second drain electrode 4b and the third electrodes 5b are formed as to partially overlap the periphery of the first drain electrode 4a and the peripheries of the lines (e.g., the gate line 1, the first data line 2a and the second data line 2b) with the interlayer insulation film 9 interposed therebetween and thus cover gaps between the first drain electrode 4a and the lines 1, 2a and 2b.

Thereafter, the LCD device 200 is completed in the same manner as in Example 1.

Hereinafter, a method for driving the LCD device 200 will be described.

For each of the picture element areas provided in a matrix, the active-matrix substrate 200a includes the first data line 2a connected to the two first TFTs 3a and the second data line 2b connected to the second TFT 3b. Thus, the time required for writing signals is set to be equal to the time required in the conventional LCD device. By turning "ON" three TFTs (3a, 3a, and 3b) connected to the one gate line 1 at the same time, signals are input to the two first drain electrodes 4a and the upper layer second drain electrode 4b, separately.

For example, by providing the two first drain electrodes 4a with a potential which is different from that of the counter electrode 5a, the electric field E1 substantially having a perpendicular component with respect to the surfaces of the insulation plates 6a and 6b is applied to the liquid crystal layer 15. At the same time, by providing the upper layer second drain electrode 4b with the same potential as that of the third electrode 5b, the electric field E2 substantially having a parallel component with respect to the surfaces of the insulation plates 6a and 6b is not applied to the liquid crystal layer 15. As a result, the liquid crystal molecules 16 are aligned so that the principal axis of the liquid crystal molecules is perpendicular to the surfaces of the insulation plates 6a and 6b. In this case, an angle formed by the light transmitted through the liquid crystal layer 15 and the principal axis of the liquid crystal molecules 16 varies in accordance with the viewing direction. As a result, the range of viewing angles in the LCD device is narrowed.

Alternatively, by providing the two first drain electrodes 4a with the same potential as that of the counter electrode 5a, the electric field substantially having a perpendicular component with respect to the surfaces of the insulation plates 6a and 6b is not applied to the liquid crystal layer 15. At the same time, by providing the upper layer second drain electrode 4b with a potential which is different from that of the third electrode 5b, the electric field substantially having a parallel component with respect to the surfaces of the insulation plates 6a and 6b is applied to the liquid crystal layer 15. As a result, the liquid crystal molecules 16 rotate in a plane parallel to the surfaces of the insulation plates 6a and 6b. In this case, an angle made of light transmitted through the liquid crystal layer 15 and the principal axis of the liquid crystal molecules 16 is maintained regardless of the viewing direction. Thus, the range of viewing angles in the LCD device is broadened.

Thus, as in the LCD device of Example 1, the LCD device of Example 2 makes it possible to control the direction of the electric field applied to the liquid crystal layer 15. Therefore, the viewing angle characteristics can be changed in accordance with a desired use and the specific conditions encountered with such a use.

Also, according to the LCD device of Example 2, two data lines 2a and 2b are provided for one gate line 1. As a result, there is no need for increasing the number of gate lines in order to independently apply a potential to each of the drain electrodes.

Moreover, according to the LCD device 200 of Example 2, the upper layer second drain electrode 4b and the third electrodes 5b are formed so as to partially overlap the periphery of the first drain electrode 4a and the peripheries of the lines 1, 2a and 2b with the interlayer insulation film 9 interposed therebetween and thus cover gaps between the first drain electrode 4a and the lines 1, 2a and 2b. Therefore, in the case where the upper layer second drain electrode 4b is formed of a metal such as Ta, for example, light leaking through the gaps between the first drain electrodes 4a and the lines 1, 2a and 2b can be shielded due to the upper layer second drain electrode 4b serving as a light-shielding layer. As a result, the pattern of the light-shielding layer 14 included in the counter substrate 200b can be reduced, thereby further improving the aperture ratio of the LCD device.

Furthermore, according to the LCD device of Example 2, even when time required for writing gate signals is set to be equal to the time required in the conventional LCD device, it is possible to independently apply a potential to each of the drain electrodes.

Although the present invention has been described with reference to the specific examples, the present invention is not limited thereto.

For example, the interlayer insulation film is formed of a photosensitive acrylic resin, which is a synthetic resin, in Examples 1 and 2, but may be formed of any other synthetic resin or an inorganic material such as silicon nitride. It is preferable to use a photosensitive acrylic resin as the interlayer insulation film for the following advantages: (1) relative ease in forming it into a film having a thickness of several micrometers; (2) relative ease in patterning; and (3) reduced capacitance between the lines overlapped with the interlayer insulation film interposed therebetween because a photosensitive acrylic resin has a dielectric constant not exceeding one-half of the dielectric constant of silicon nitride. Moreover, a photosensitive acrylic resin makes it possible to perform the film formation and patterning simultaneously, thus simplifying production. Although the thickness of the interlayer insulation film is not limited to the thickness described above, the thickness is preferably about 1 $\mu$m to about 10 $\mu$m and more preferably about 3 $\mu$m to about 6 $\mu$m in light of the device characteristics and production process.

Also, according to the above-described examples, the upper layer second drain electrode and the third electrodes are provided above the first drain electrode with the interlayer insulation film interposed therebetween. It is also possible to provide the first drain electrode above the upper layer second drain electrode and the third electrodes with the interlayer insulation film interposed therebetween.

As to the first drain electrode and the upper layer second drain electrode, at least one of each is provided for each picture element area in Examples 1 and 2, but a plurality of the first drain electrodes and upper layer second drain electrodes may be provided. Also, three or more gate lines may be provided for one data line. Alternatively, three or more data lines may be provided for one gate line. The first TFT and the second TFT are each connected to a different data line or a different gate line, thereby making it possible to independently apply a potential to each of the drain electrodes connected to each of the TFTs. Due to such a system, the aperture ratio of the LCD device can be improved without increasing the number of lines. On the other hand, in the case where the gate lines and the data lines of the same number are provided, the first TFT and the second TFT are each connected to a different data line and a different gate line, thereby making it possible to independently apply a potential to each of the drain electrodes connected to each of the TFTs.

Also, according to the above-described examples, the upper layer second drain electrode and the third electrode are parallel to the data lines. Alternatively, the upper layer second drain electrode and the third electrode may be parallel to the gate lines.

Moreover, in the above-described examples, the present invention is applied to the LCD devices of the Cs-on-Gate System, but may be applied to LCD devices of the Cs-on-Common System.

Furthermore, in the above-described examples, the present invention was applied to the LCD device including TFTs serving as switching elements, but may be applied to an LCD device including other switching elements such as MIM (Metal-Insulator-Metal) elements.

As is apparent from the above, the present invention makes it possible to control the direction of an electric field applied to the liquid crystal layer. Thus, the viewing angle characteristics can be changed in accordance with a desired use and the specific conditions encountered with such a use.

According to the present invention, a data line and two or more gate lines are provided for each of the picture element areas and the first electrode and the second electrode are each connected to a different gate line. As a result, a potential can be independently applied to each of the electrodes. Alternatively, two or more data lines and a gate line are provided for each of the picture element areas and the first electrode and the second electrode are each connected to a different data line. As a result, a potential can be independently applied to each of the electrodes. Accordingly, the need for increasing the number of lines is eliminated, thereby simplifying the structure of the LCD device.

In the case where at least one of the second electrode and the third electrodes partially overlaps gaps between the first electrode and the lines (e.g., the data line and the gate line), at least one of the second and the third electrodes functions as a light-shielding film. Alternatively, in the case where the first electrode partially overlaps gaps between at least one of the second and the third electrodes and the lines, the first electrode functions as a light-shielding film. Accordingly, the pattern of the light-shielding film included in the counter substrate can be reduced, thereby further improving an aperture ratio of the LCD device.

In the case where the interlayer insulation film is formed of a photosensitive acrylic resin, which is a synthetic resin, the production process of the LCD device can be simplified and a satisfactory device quality can be obtained.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display device, comprising:
   a first plate and a second plate;
   a liquid crystal layer provided between the first plate and the second plate;
   an interlayer insulation film provided between the first plate and the liquid crystal layer;
   a first electrode provided on a first face of the interlayer insulation film;
   a plurality of picture elements, each comprising a second electrode and a third electrode provided on a second face of the interlayer insulation film, the second electrode and the third electrode generating an electric field substantially having a parallel component with respect to the first plate and the second plate; and
   a counter electrode provided between the second plate and the liquid crystal layer,
   wherein the first electrode and the counter electrode face each other in a first direction, and
   wherein the second electrode and the third electrodes are provided in a picture element area at equal intervals in an alternate manner in a second direction perpendicular to the first direction.

2. A liquid crystal display device according to claim 1, wherein the interlayer insulation film is formed of a synthetic resin.

3. A liquid crystal display device according to claim 1, wherein the interlayer insulation film is formed of a photosensitive acrylic resin.

4. A liquid crystal display device according to claim 1, wherein the interlayer insulation film has a thickness of about 1 $\mu$m to about 10 $\mu$m.

5. A liquid crystal display device comprising:
   a first plate and a second plate;
   a liquid crystal layer provided between the first plate and the second plate;
   an interlayer insulation film provided between the first plate and the liquid crystal layer;
   a first electrode provided on a first face of the interlayer insulation film;
   a plurality of picture elements, each comprising a second electrode and a third electrode provided on a second face of the interlayer insulation film;
   a counter electrode provided between the second plate and the liquid crystal layer, wherein the first electrode and the counter electrode face each other in a first direction, and wherein the second electrode and the third electrodes are provided in a picture element area at equal intervals in an alternate manner in a second direction perpendicular to the first direction;
   a data line and at least two gate lines provided between the first plate and the interlayer insulation film for the picture element area;
   a first switching element electrically coupled to one of the gate lines; and
   a second switching element electrically coupled to the other gate line, wherein the data line and the at least two gate lines cross each other, wherein the first electrode is connected to the data line via the first switching element, and wherein the second electrode is connected to the data line via the second switching element.

6. A liquid crystal display device according to claim 5, wherein at least one of the second electrode and the third electrode covers at least one of a gap between each of the at least two gate lines and the first electrode and a gap between the data line and the first electrode, thereby shielding light transmitted through the gap.

7. A liquid crystal display device according to claim 5, wherein the first electrode covers at least one of:
   a gap between each of the at least two gate lines and the second electrode,
   a gap between each of the at least two gate lines and the third electrode,
   a gap between the data line and the second electrode, and
   a gap between the data line and the third electrode,
   thereby shielding light transmitted through the gap.

8. A liquid crystal display device comprising:
   a first plate and a second plate;
   a liquid crystal layer provided between the first plate and the second plate;
   an interlayer insulation film provided between the first plate and the liquid crystal layer;
   a first electrode provided on a first face of the interlayer insulation film;
   a plurality of picture elements each comprising a second electrode and a third electrode provided on a second face of the interlayer insulation film;
   a counter electrode provided between the second plate and the liquid crystal layer, wherein the first electrode and the counter electrode face each other in a first direction, and wherein the second electrode and the third electrodes are provided in a picture element area at equal intervals in an alternate manner in a second direction perpendicular to the first direction;
   at least two data lines and a gate line provided between the first plate and the interlayer insulation film for the picture element area;
   a first switching element connected to one of the data lines; and
   a second switching element connected to the other data line, wherein the at least two data lines and the gate line cross each other, wherein the first electrode is connected to one of the data lines via the first switching element, and wherein the second electrode is connected to the other data line via the second switching element.

9. A liquid crystal display device according to claim 8, wherein at least one of the second electrode and the third electrode covers at least one of a gap between each of the at least two gate lines and the first electrode and a gap between the data line and the first electrode, thereby shielding light transmitted through the gap.

10. A liquid crystal display device according to claim 8, wherein the first electrode covers at least one of:
    a gap between each of the at least two gate lines and the second electrode,
    a gap between each of the at least two gate lines and the third electrode,
    a gap between the data line and the second electrode, and
    a gap between the data line and the third electrode,
    thereby shielding light transmitted through the gap.

11. A method for driving a liquid crystal display device, the liquid crystal display device comprising:

a first plate and a second plate, a liquid crystal layer provided between the first plate and the second plate, an interlayer insulation film provided between the first plate and the liquid crystal layer, a first electrode provided on a first face of the interlayer insulation film, a plurality of picture elements, each comprising a second electrode and a third electrode provided on a second face of the interlayer insulation film, and a counter electrode provided between the second plate and the liquid crystal layer, wherein the first electrode and the counter electrode face each other in a first direction, and wherein the second electrode and the third electrodes are provided in a picture element area at equal intervals in an alternate manner in a second direction perpendicular to the first direction, the method comprising the step of applying a different potential to each electrode of one of a pair of the first electrode and the counter electrode and a pair of the second electrode and the third electrode, and applying an identical potential to each electrode of the other pair.

* * * * *